United States Patent
Buttke et al.

[15] 3,668,761
[45] June 13, 1972

[54] MACHINE FOR MANUFACTURING ELECTRIC STORAGE BATTERIES

[72] Inventors: Richard A. Buttke; Anthony Sabatino; Daniel Orlando, all of Milwaukee; William H. Behrens, Racine, all of Wis.

[73] Assignee: Globe-Union Inc., Milwaukee, Wis.

[22] Filed: Sept. 4, 1970

[21] Appl. No.: 69,828

Related U.S. Application Data

[62] Division of Ser. No. 268,359, March 27, 1963, Pat. No. 3,544,754.

[52] U.S. Cl. .............................29/204 D, 228/56.5, 228/58
[51] Int. Cl. .....................................................H01m 37/00
[58] Field of Search..................29/204, 204 D; 228/56.5, 58; 219/79

[56] References Cited

UNITED STATES PATENTS 3,052,962  9/1962  Kerns.....................................29/204

*Primary Examiner*—Thomas H. Eager
*Attorney*—John W. Michael, Gerrit D. Foster, Bayard H. Michael, Paul R. Puerner and Spencer B. Michael

[57] ABSTRACT

Apparatus for aligning conductive portions of adjacent cell element assemblies on opposite sides of battery partition walls so that an intercell weld can be made through those walls between the aligned conductive portions includes a plurality of pairs of bifurcated aligning extensions depending from an aligning head. A battery support is positioned below the aligning head and provision is made for producing relative movement between the aligning extensions and the battery support so that the extensions can be brought into engagement with conductive portions of cell element assemblies contained in a battery resting on the battery support. The pairs of extensions are relatively spaced in accordance with the relative spacing of the adjacent conductive portions of the battery cell element assemblies and the bifurcations in each pair of aligning extensions are relatively aligned so that the extensions will engage and align conductive portions of adjacent assemblies. Provision is also made for testing the position of the cell element assemblies in the battery as well as the position of the battery per se on the battery support. The testing arrangement is effective to produce a signal in the event of a completely misaligned battery or misaligned battery cell element assemblies.

9 Claims, 22 Drawing Figures

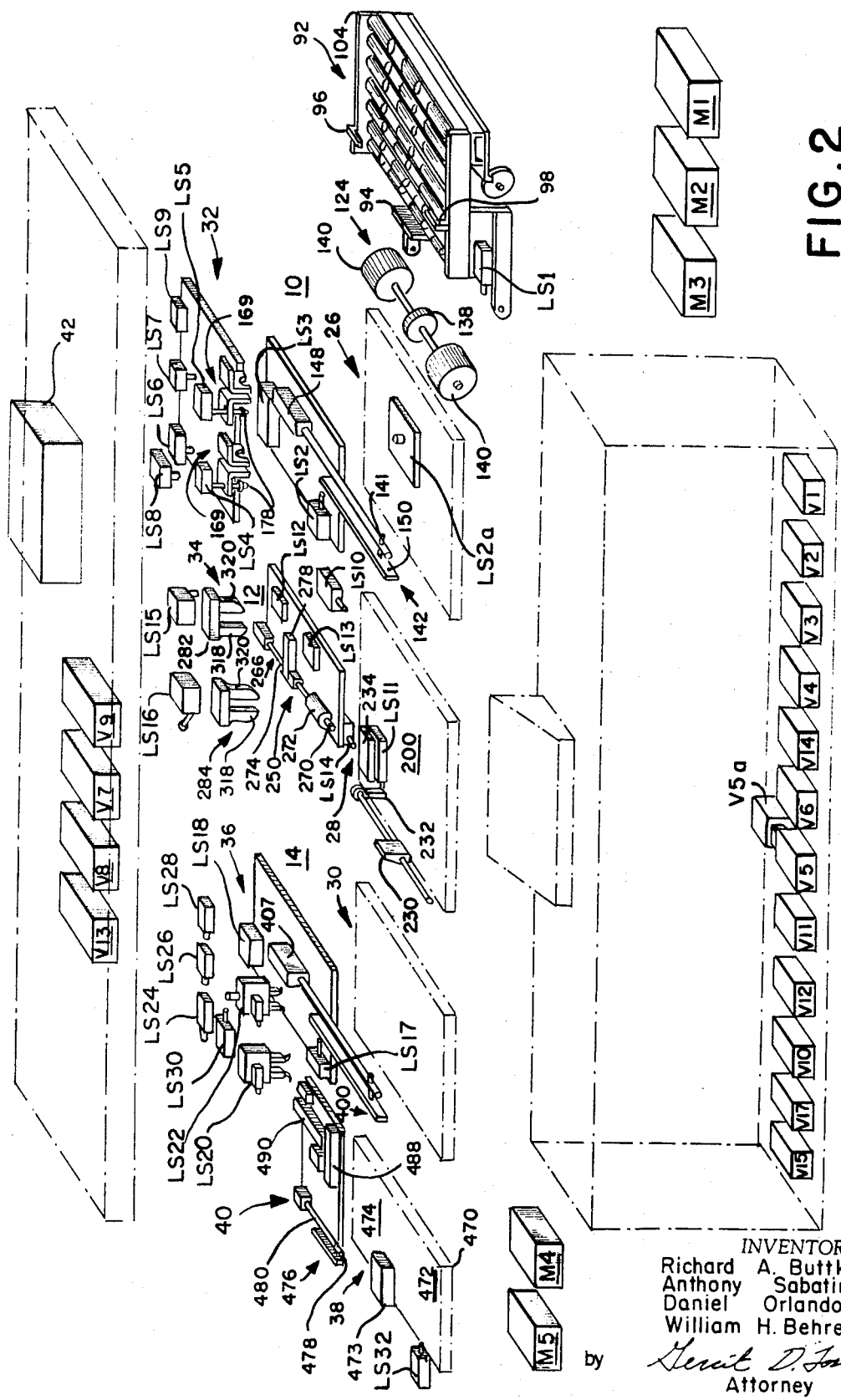

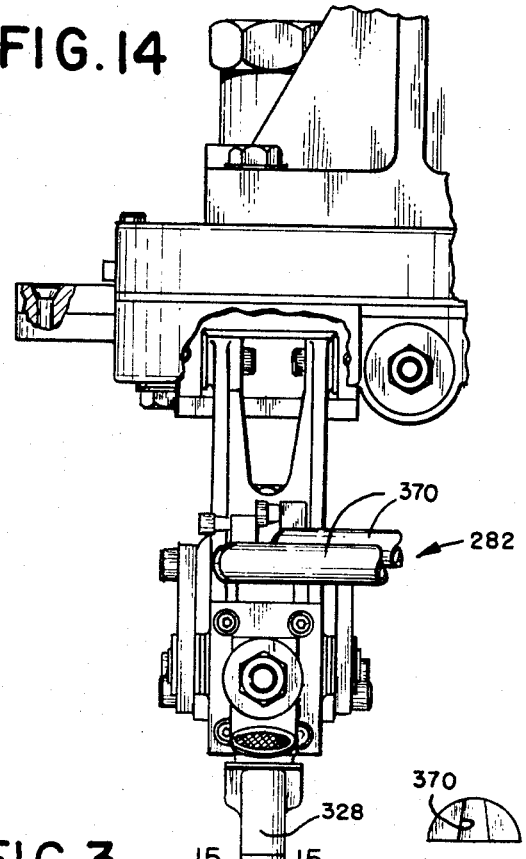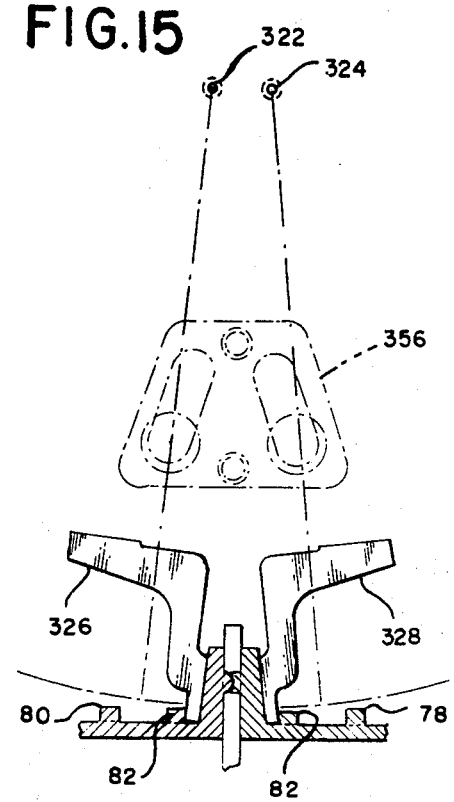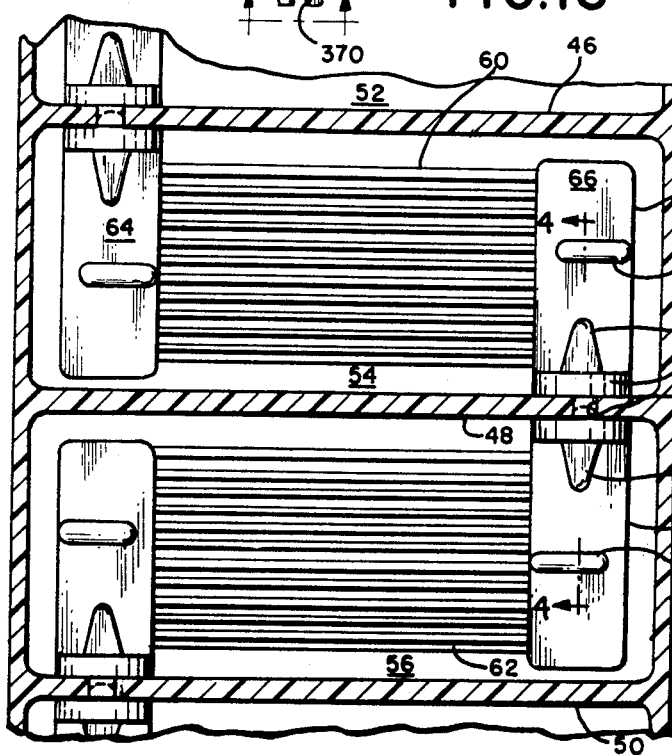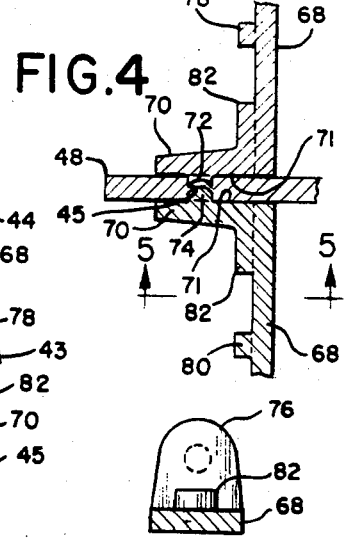

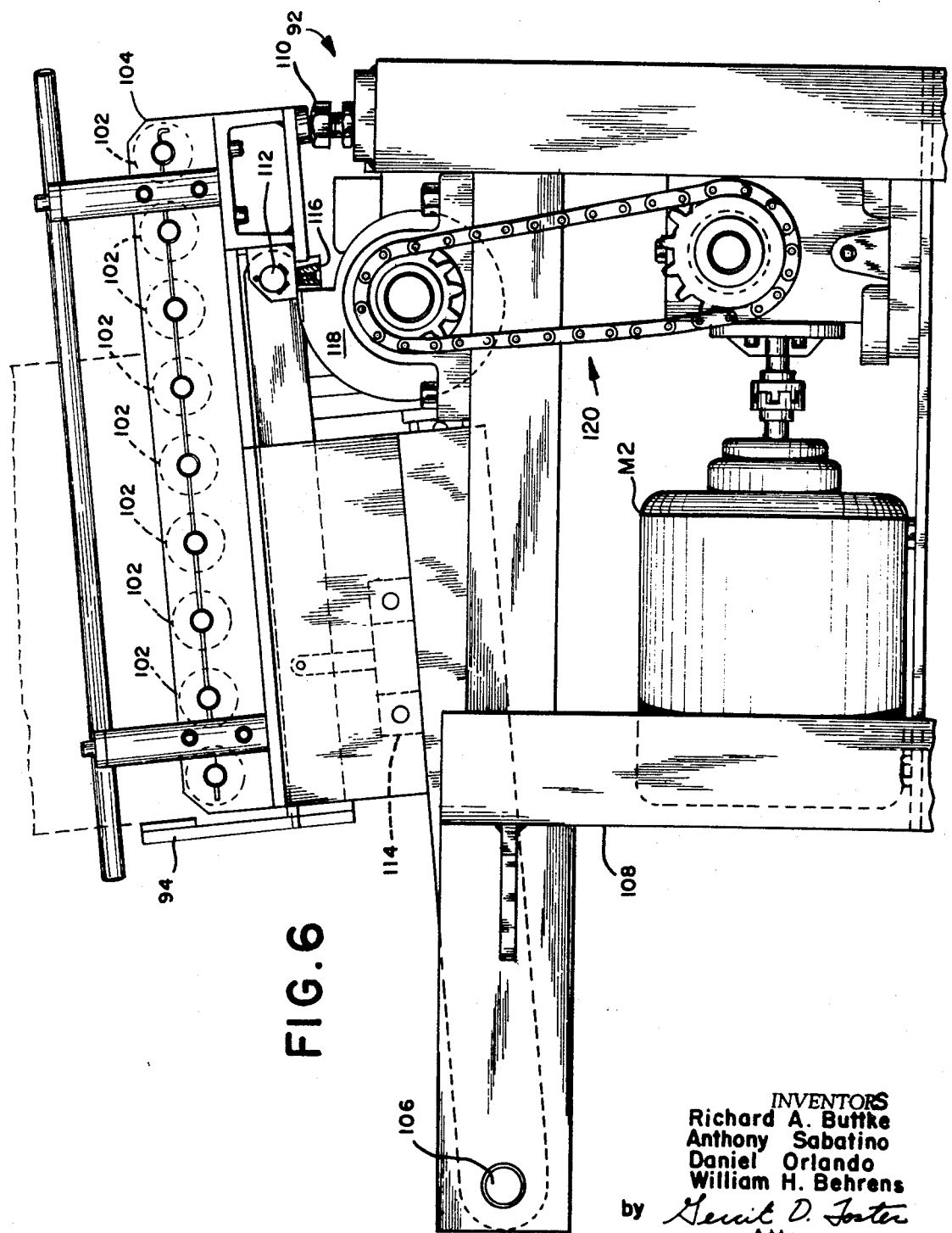

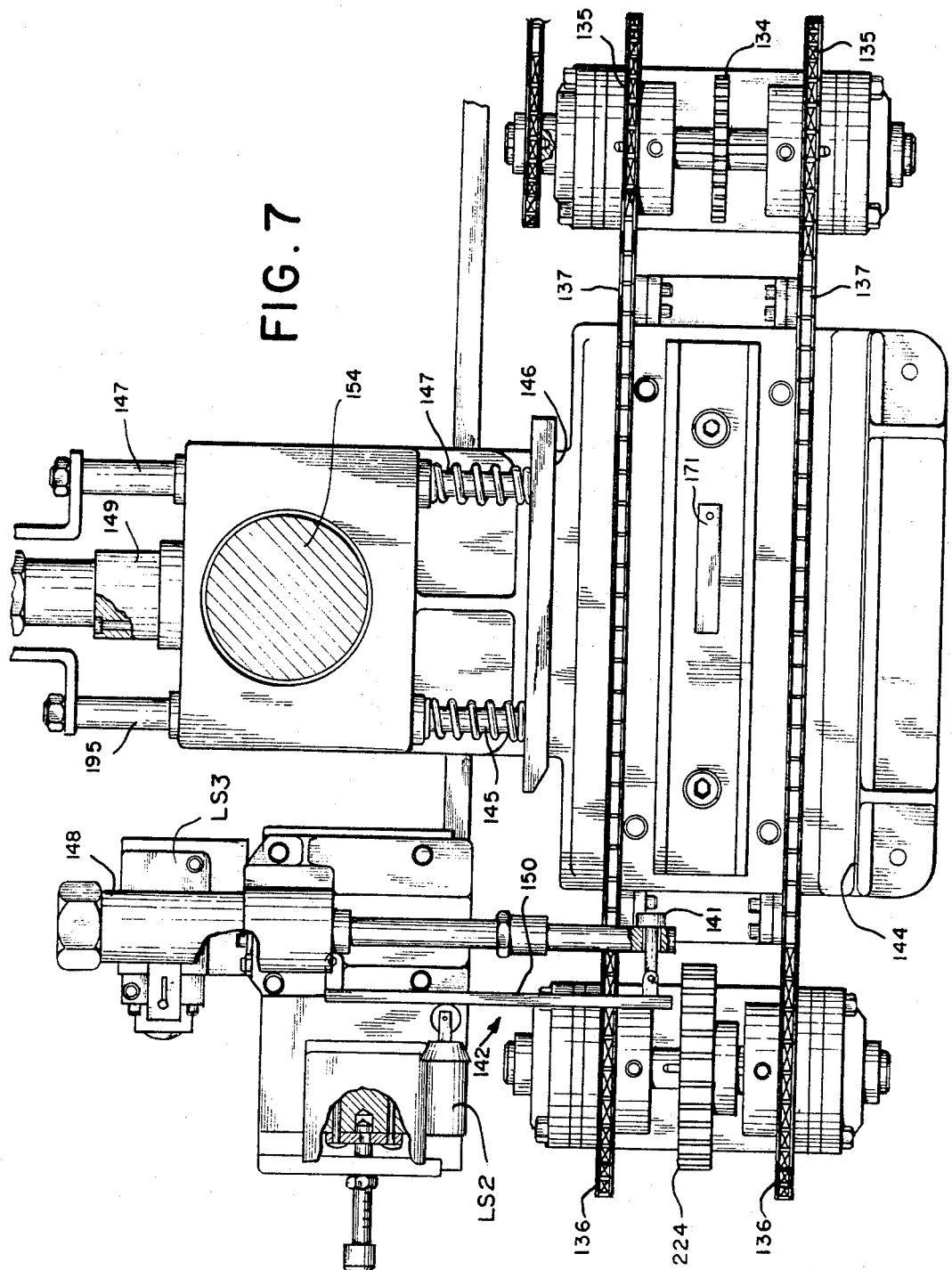

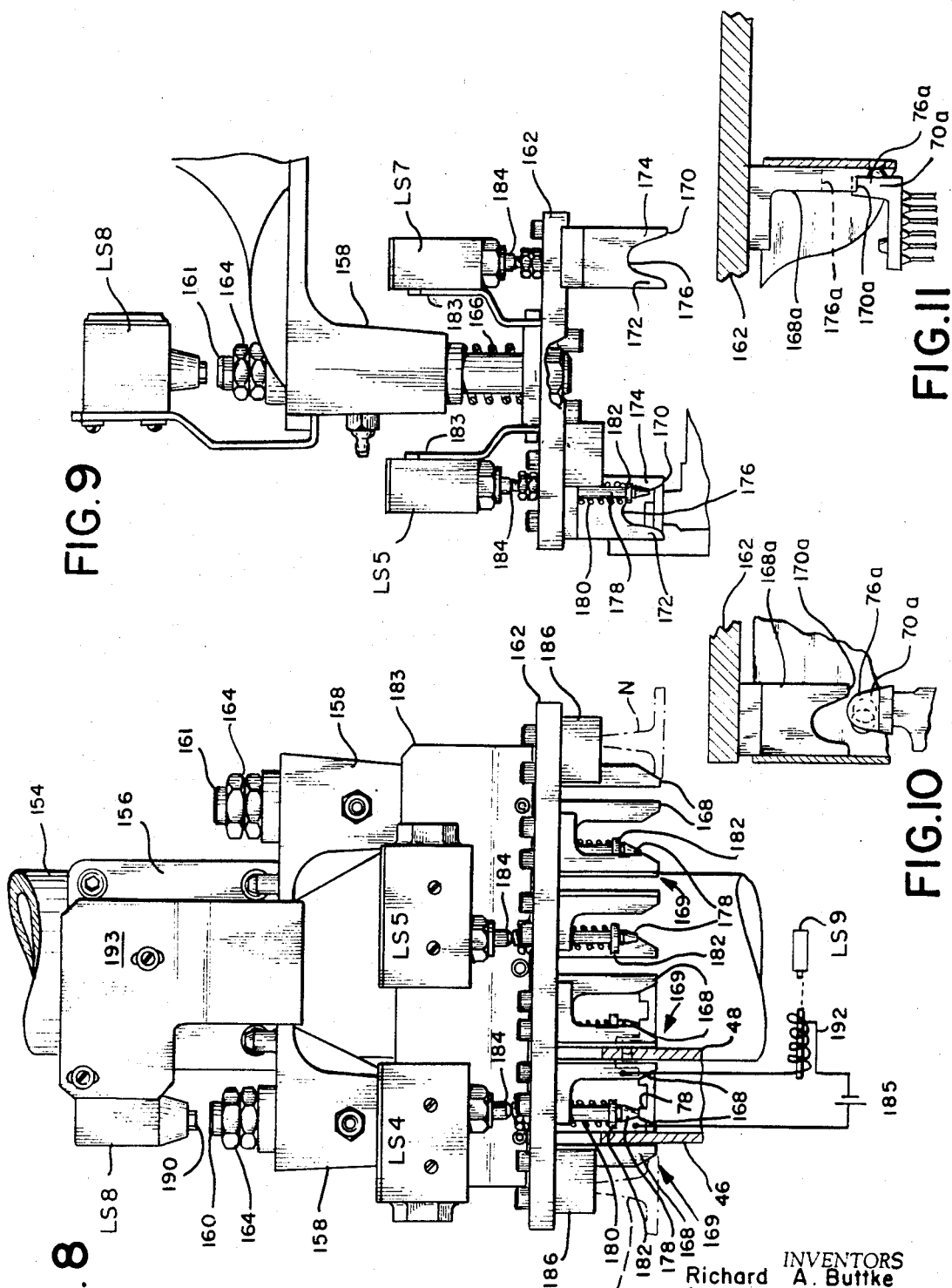

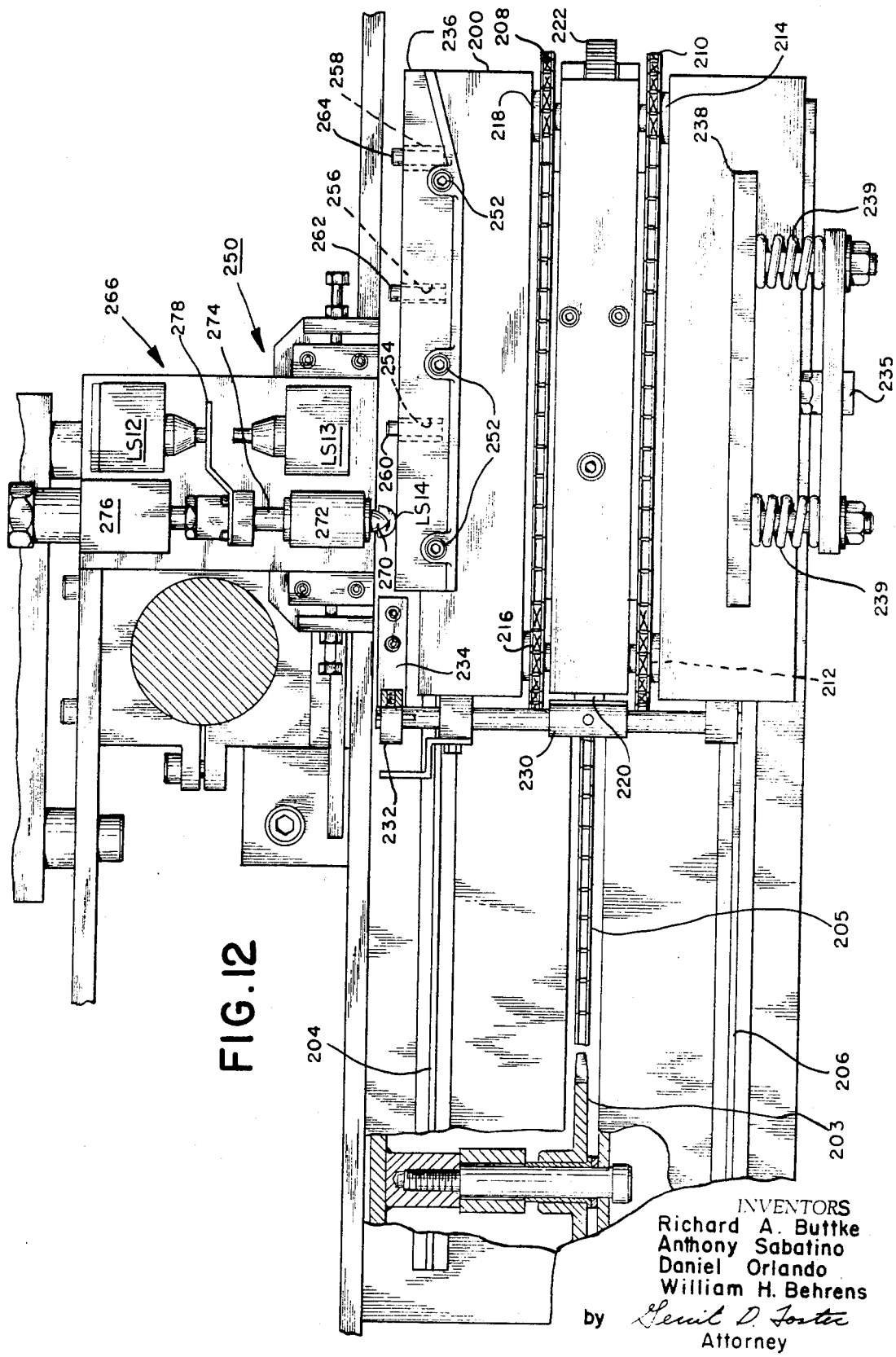

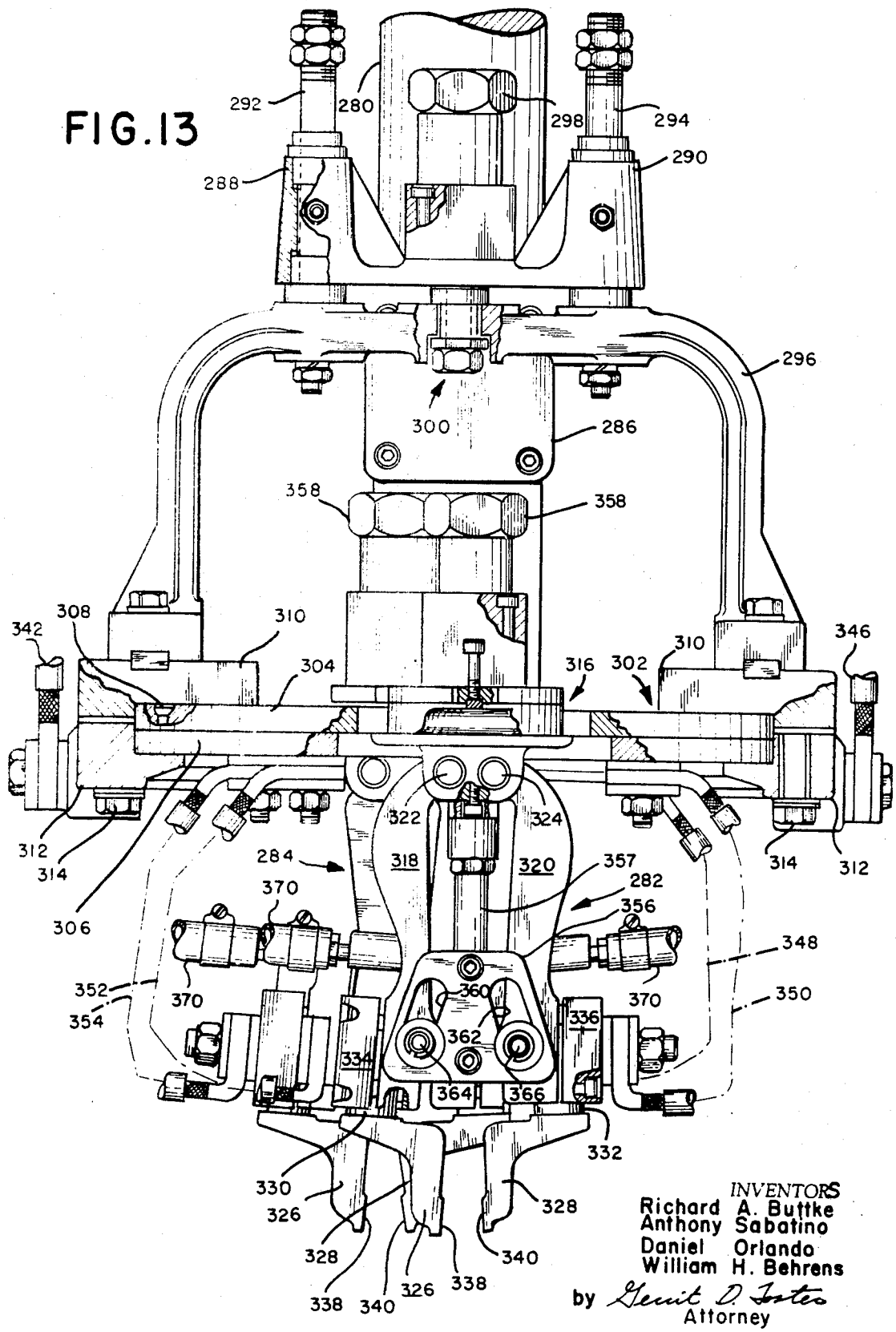

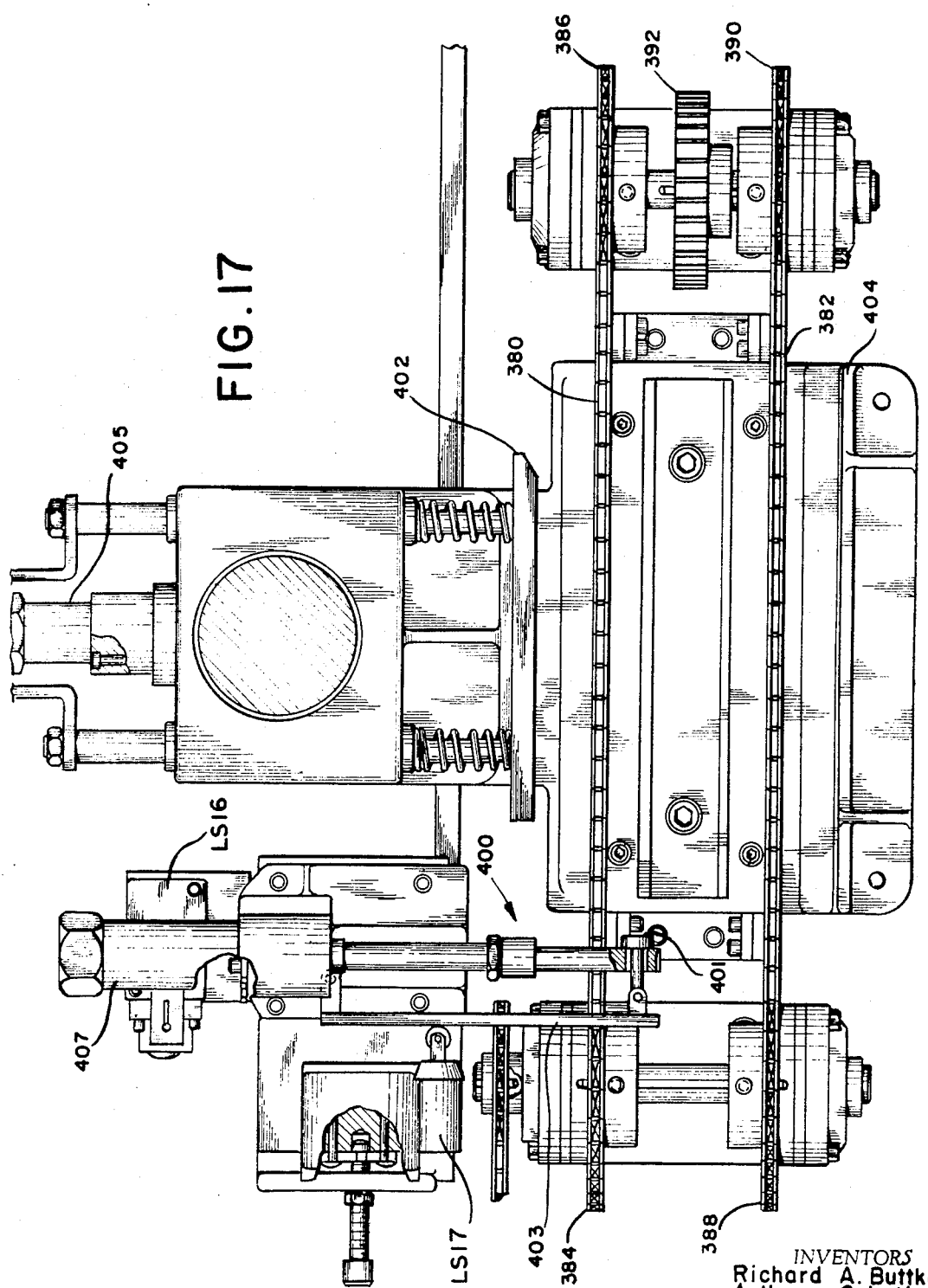

INVENTORS
Richard A. Buttke
Anthony Sabatino
Daniel Orlando
William H. Behrens by *Gerrit D. Foster*
Attorney

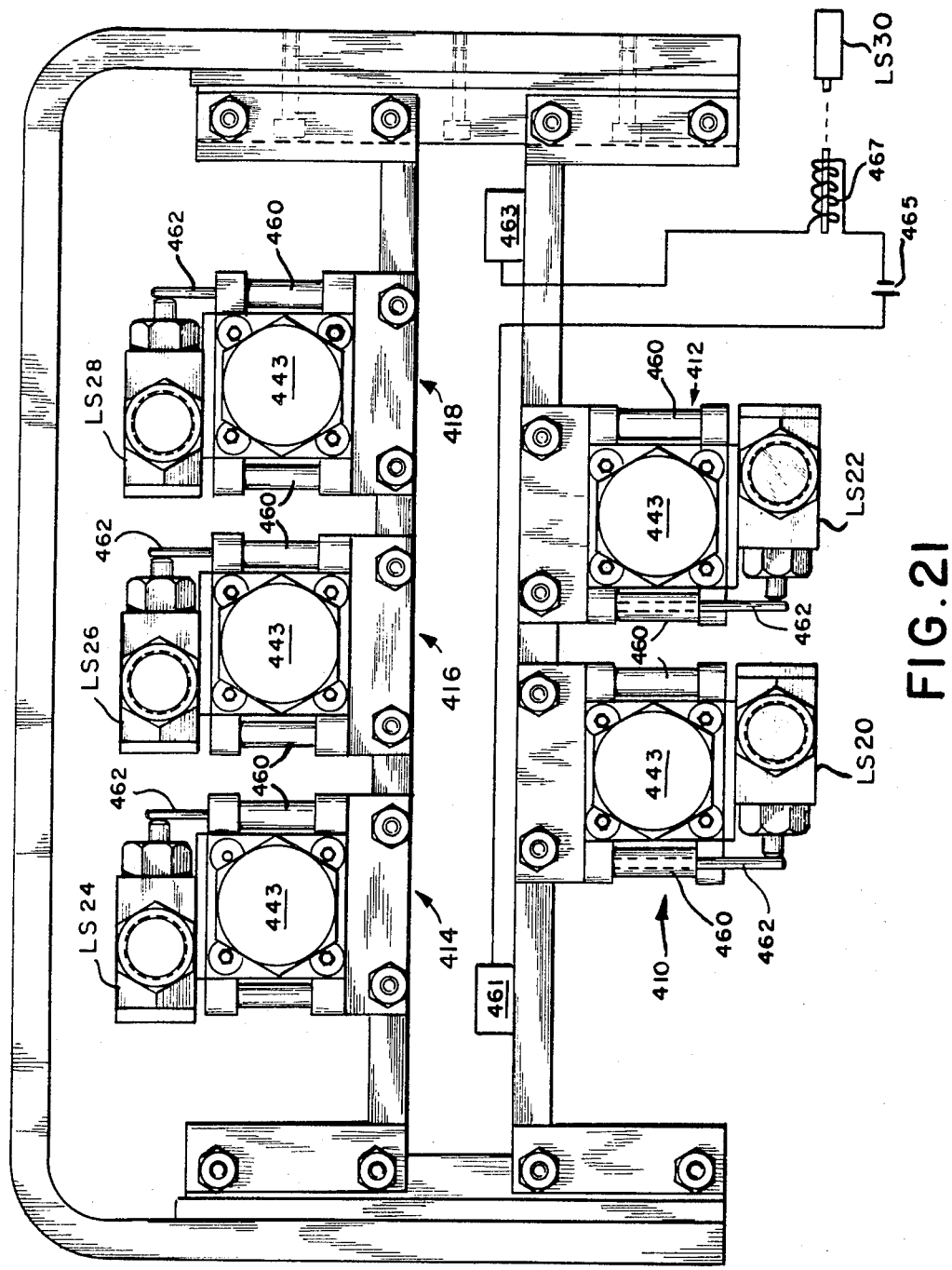

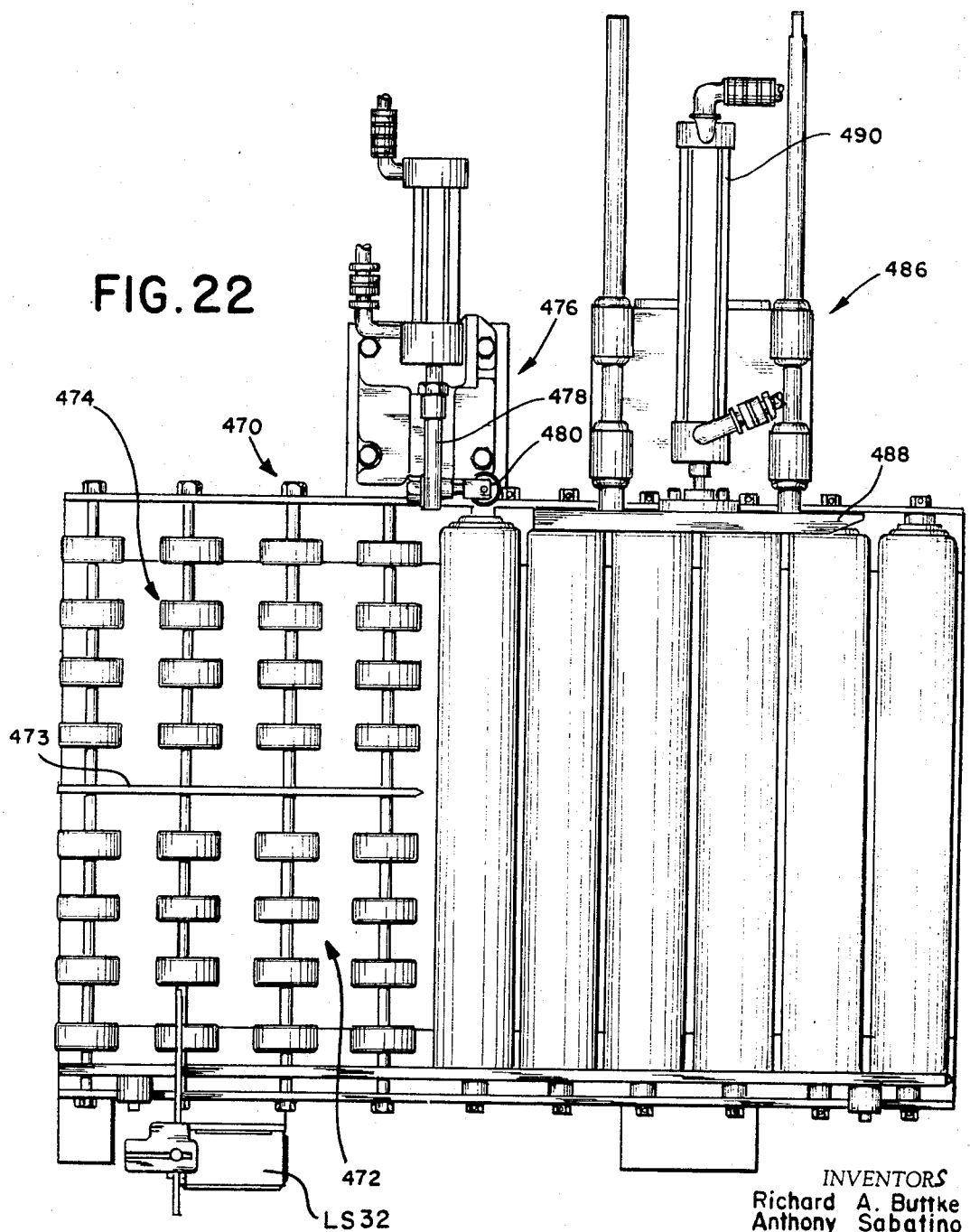

MACHINE FOR MANUFACTURING ELECTRIC STORAGE BATTERIES

This is a division of application Ser. No. 268,359, filed Mar. 27, 1963, now U.S. Pat. No. 3,544,754, granted Dec. 1, 1970.

This invention relates to the manufacture of electric storage batteries.

Particular application of this invention is found in the manufacture of electric batteries which utilize an intercell connection of the type disclosed and claimed in U.S. Pat. No. 3,313,658 of Anthony Sabatino and Daniel Orlando, which issued from application Ser. No. 491,499, filed Sept. 16, 1965 as a continuation of application Ser. No. 214,083, filed Aug. 1, 1962, the patent and these applications having been assigned to the assignee of this application, application Ser. No. 214,083 now being abandoned.

In very general terms, such an intercell connection consists of bringing a cell connector through a partition wall of a battery and forming a mechanical and electrical joint between adjacent cell element assemblies disposed on opposite sides of the partition walls of the battery. Such an intercell construction exhibits many recognized advantages such as improved operating characteristics, lower internal resistance, elimination of various corrosion problems and the potential of reducing battery size while maintaining power output or, conversely, increasing the power output within the physical limits set by prior art battery constructions. However, intercell battery constructions present various problems from a manufacturing standpoint, for example to insure an adequate electrical and mechanical joint and also a sealed connection with the partition walls to prevent leakage of electrolyte between cell areas, proper alignment of the intercell connecting lugs with each other and the partition opening is necessary. Such manufacturing problems are compounded in attempts at providing for automated battery manufacture.

An object of this invention is to provide a completely automated machine for making an intercell connection in a battery.

Another object of this invention is to provide an automated machine which automatically aligns and welds battery cell element assemblies to provide an intercell connection.

Still another object of this invention is to provide a completely automated machine for making an intercell connection which is capable of monitoring the batteries being presented for welding and which is capable of passing any batteries which are not in proper condition for welding through the machine without undergoing the welding operation.

In the preferred type of intercell connection described and claimed in the above identified applications, the condition of the finished intercell connection cannot be visually inspected and a further object of this invention is to provide for electrically and mechanically testing intercell battery connections.

A still further object of this invention is to provide, in addition to electrical and/or mechanical testing, automatic rejection of batteries containing defective intercell connections.

The preferred machine for achieving these and other objects of this invention will be described in detail hereinafter. However, a general description of this invention at this point will aid materially in a more ready and complete understanding of this invention. The process of this invention contemplates the forming of an intercell connection by subjecting a battery to the steps of aligning the intercell connecting portions of adjacent cell element assemblies, forming a mechanical and electrical joint between those portions and subsequently testing the joint for predetermined minimum mechanical and electrical characteristics. Furthermore, the process contemplates testing battery cell element assemblies electrically and for alignment in the battery and, also, to test the alignment of the battery itself in the machine, all prior to the welding step. Should the battery fail any one, or all, of these tests a circuit is set up whereby the misaligned or electrically defective battery bypasses the welding step. The testing step of this invention also contemplates the provision of automatic rejection of batteries which fail under these particular testing procedures.

The machine contemplated by this invention includes a welding station at which the intercell connections are made, an aligning station which receives the batteries prior to the welding station and properly aligns the intercell connecting portions for welding and a test station which receives the battery from the welding station and electrically and mechanically tests the intercell connections to insure that the connections meet certain minimum mechanical and electrical requirements. In its more specific aspects, a machine embodying this invention contemplates additional refinements which includes an arrangement at the aligning station for electrically testing each of the battery cell element assemblies to determine whether or not they are electrically complete for welding, and a testing arrangement to check the position of the battery cells in the battery casing and the position of the battery in the machine. These various test mechanisms are operatively associated with the weld station so that in the event a battery fails any one of these tests the weld station will be de-energized for a time sufficient to allow that particular battery to pass through the weld station without the weld operation being performed. A desirable refinement at the weld station is to provide for final alignment of the battery cell intercell connecting portions just prior to making the weld connection. Furthermore, a reject mechanism, controlled by the test station, is provided so that should an intercell connection fail either mechanically or electrically the reject mechanism will be activated and the battery containing the defective intercell connection will be automatically rejected from the normal output line of the machine. With these refinements a battery is continuously monitored as it passes through the machine with the various machine stations interconnected and cooperating sole that electrically defective battery cell elements, misaligned battery and cell element assemblies will be detected and passed through the machine with the elimination of any welding step and defective welds will be detected and automatically rejected at the output station of the machine.

The operation of the machine is essentially timer controlled, however, control means are also provided at each station for cooperation with the timer control mechanism in initiating the various operational cycles of the machine. The control means provide an arrangement whereby the battery, on its passage through the machine, exerts some control over the operations performed on the battery.

Other objects and advantages will be pointed out in, or be apparent from the specification and claims, as will obvious modifications of the embodiments shown in the drawings, in which:

FIG. 2 is a generally schematic view, in perspective, of a machine embodying this invention;

FIG. 3 is a partial plan view of a battery of the type processed by this machine;

FIG. 4 is a section view generally along lines 4—4 of FIG. 3 illustrating the cell element assembly conductive straps prior to making the intercell connection;

FIG. 5 is a section view along lines 5—5 of FIG. 4;

FIG. 6 is a side elevation of the tamping ramp;

FIG. 7 is a plan view of the aligning station conveyor;

FIG. 8 is a front elevation of the aligning head illustrating its engagement with a battery in process;

FIG. 9 is an end view of the aligning head also illustrating its engagement with a battery;

FIG. 10 is a partial view of an alternative aligning arrangement;

FIG. 11 is an end view of the alignment arrangement of FIG. 10;

FIG. 12 is a top plan view of the weld station truck conveyor;

FIG. 13 is a front elevation of the welding head;

FIG. 14 is a partial end view of the welding head;

FIG. 15 is a partial view of one of the welding jaws in a clamped position for welding;

FIG. 16 is a bottom plan view of one of the welding jaw ends taken generally along lines 15—15 of FIG. 14;

FIG. 17 is a top plan view of the testing station conveyor;

FIG. 21 is a top plan view of the testing station; and

FIG. 22 is a top plan view of the unload conveyor and reject mechanism.

Figure 1:
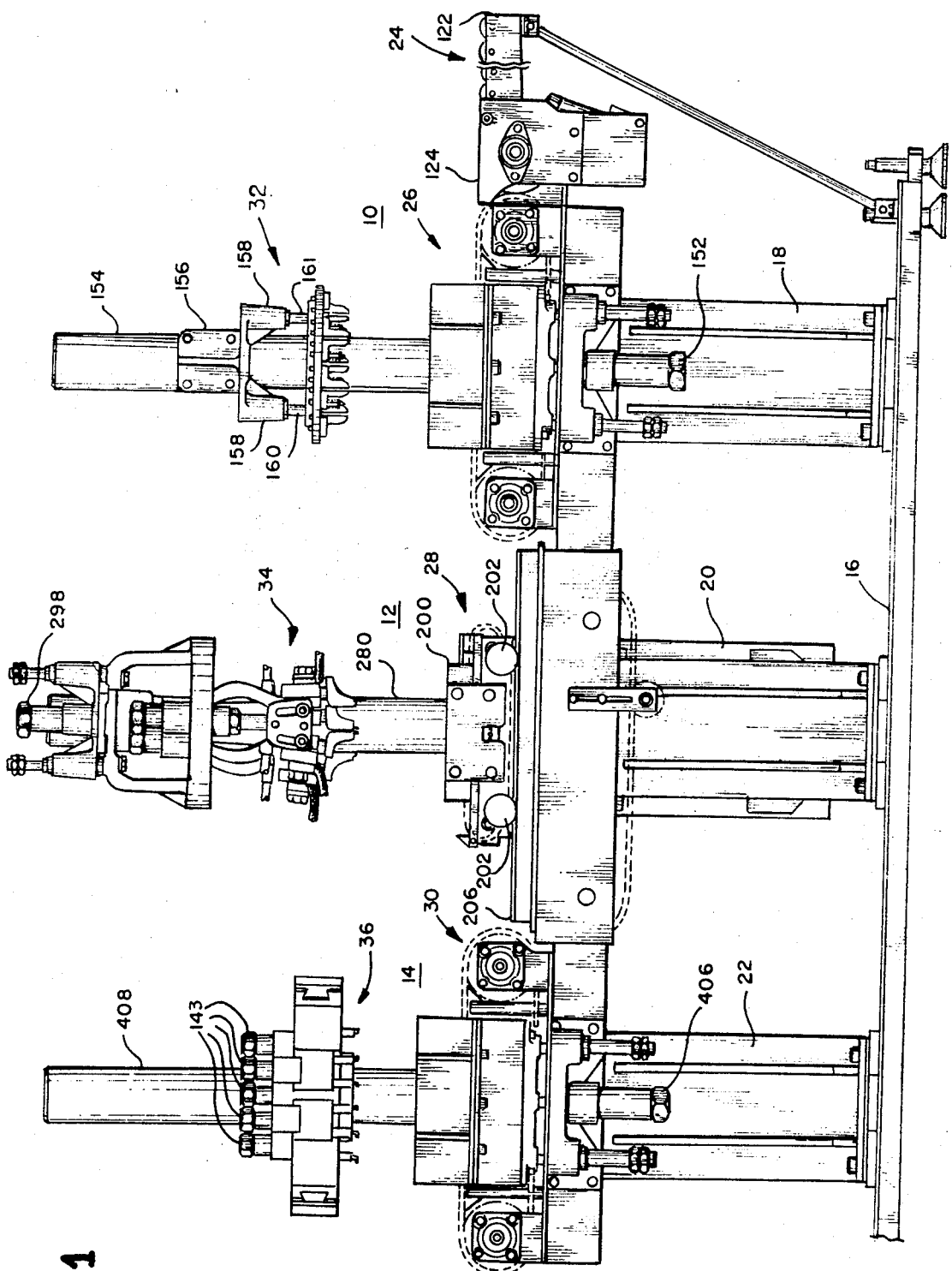
FIG. 1 is a front elevation of the aligning, welding and testing stations of a machine embodying this invention and with the front control panel of the machine removed, and parts of the testing, welding and aligning heads having also been removed for clarity.

With particular reference to the drawings, this invention is illustrated as embodied in a machine including align station 10, weld station 12 and test station 14 supported on a common base 16 by vertical frames 18, 20 and 22, respectively. Batteries are delivered to the machine by a supply conveyor 24 (only a portion of which is illustrated) and are transported from right to left through the machine by the combination of align station conveying means 26, weld station conveying means 28 and test station conveying means 30.

In general terms, batteries are delivered to align station conveyor 26 and transported to the aligning head 32 where the particular elements going into the intercell connections are properly aligned, within the battery case, the cell element assemblies are tested electrically for missing separators, and the battery itself is checked for reversed cell assemblies. The aligned and tested battery is then transferred to weld station conveyor 28 and is transported to welding head 34 where the intercell connections are made to provide a mechanical and electrical connection between adjacent cell element assemblies. From the weld station, the batteries containing the cell element assemblies connected by an intercell connection, are transported to test station conveyor 30. At the test station, the battery is engaged with a testing head 36 where the intercell connections are subjected to both mechanical and electrical tests to determine whether or not the intercell connection made at weld station 12 are in accordance with prescribed minimum electrical and mechanical requirements. Assuming that the intercell connections are acceptable, the batteries are discharged from the test station onto an output conveyor 38 and are ready for the additional fabrication steps necessary to provide a completed electric battery. However, should testing head 36 detect a defective intercell connection, from either an electrical or mechanical standpoint, reject means 40 is activated so that when the battery containing the defective intercell joint is received onto output conveyor 38 it will be moved into a reject line from which it can be taken for inspection, realignment and/or repair as required. At this point it should be noted that this invention further contemplates that should a battery fail either of the alignment tests or the electrical test at the align station the weld station is de-energized for a predetermined length of time sufficient to permit that battery to pass without being welded. This battery can also be removed from the output conveyor and reworked as required and then reinserted in the machine. As will appear from the detailed description, passage of batteries through the machine and machine operation are essentially timed operations controlled by timer 42 (see FIG. 2) of well known construction.

The above description constitutes a very general outline of the machine, its function and the process carried out by the machine and should be helpful to a ready understanding of the following more detailed description. However, before entering into the detailed description of the machine and process, a brief description of the type of battery construction with which this machine is preferably used will also be helpful. With reference to FIGS. 3-5, a battery 43 (only a portion of which is illustrated) comprises an outer casing 44 and transverse partition walls 46, 48 and 50 dividing the battery interior into separate cell element areas 52, 54 and 56. Cell element assemblies of well known construction are positioned in the various areas, for example assemblies 60 and 62 illustrated in areas 54 and 56, and comprise positive and negative plates connected by conductive straps 64 and 66 located at the opposed ends of the battery cell element assemblies with one of the conductive straps connected to the positive plates and the other to negative plates of the cell element assemblies. These straps are preferably cast-on in accordance with the process described and claimed in the copending U. S. Pat. application of Anthony Sabatino and Paul V. Lowe, entitled "Method of Making Storage Battery Elements," Ser. No. 813,865 and filed May 18, 1959 and assigned to the assignee of this application, now U.S. Pat. No. 3,087,005, issued Apr. 23, 1963. The strap members are similar in shape, each including a horizontal portion 68 and a vertical portion 70 positioned at right angles to each other. A number of vertical portions 70 of the conductive steps carry concave intercell connecting lugs 72, while others carry convex lugs 74 and are connected on the cell element assemblies so that when arranged in the battery casing, a strap on one side of a partition wall includes a convex lug with the adjacent strap on the other side of the partition wall having a concave lug. The lugs are arranged to fit into an aperture 45 in the partition wall and mate with each other. For purposes which will become evident from the following description, vertical portion 70 includes a generally rounded upper end 76 and elongated projections 78 and 80 are provided on horizontal portions 68 which extend from a marginal edge of the horizontal portions and terminate in spaced relationship from the opposed marginal edge thereof. As can be seen in FIG. 3 the projections 78 and 80 of straps arranged on opposite sides of a partition wall are offset one from the other. Furthermore, a wedge-shaped projection 82 is provided at the joint between vertical portion 70 and horizontal portion 68. The offset and wedge-shaped projections cooperate in the aligning and testing steps of the machine as will be discussed more completely hereinafter.

The faces 71 of the vertical portions 70 are flat and engage the partition walls so that, in addition to providing a good electrical and mechanical connection by welding lugs 72 and 74, a sealed connection at the partition wall is maintained and is adequate to insure against leakage of electrolyte between cell areas. The weld connection also contributes to this sealed connection as the weld material, lugs 72 and 74 when melted, fill the partition openings and prevent leakage of electrolyte.

With this battery construction in mind, the machine and the process carried out thereby will now be described in detail and, for convenience, the description will be broken down into the various stations of the machine, namely the supply conveyor, the align, weld and test stations, and the output conveyor.

SUPPLY CONVEYOR

Batteries including cell element assemblies constructed as described and assembled into the cell element receiving areas are placed onto a moving supply conveyor (not shown) which is driven by a suitable power source such as motor M1 shown schematically in FIG. 2. The cell element assemblies should be securely seated in the case and to insure this secure seating a battery tamping ramp 92 is provided onto which the supply conveyor discharged the batteries (see FIGS. 2 and 6). Tamping ramp 92 includes a battery retainer 94 positioned in the path of batteries placed on the tamping ramp and photocell element 96 and light source 98 are also positioned on the tamping ramp. The photocell arrangement is connected in the control circuit for tamping motor M2. Retainer 94 engages and holds a battery on the tamping ramp and in a position to interrupt the light between light source 98 and photocell 96 to establish a circuit whereby timer 42 can energize tamping motor M2.

Turning now to a more detailed mechanical description of tamping ramp 92, a plurality of rollers 102 are supported in a pivotally mounted bed 104. Bed 104 is pivotally connected at 106 to a fixed frame 108, and its opposite or free end engages a stop 110 on frame 108. Retainer 94 is pivoted at point 112 on bed 104 and is actuated by a hydraulic cylinder 114 which is controlled by valve V1 and moves the retainer into and out of the path of batteries passing over rollers 102. A cam follower 116 on the underside of bed 104 is positioned for engagement with a rotatable cam 118 which is connected to motor M2 by chain drive 120. Energization of motor M2 by timer 42 rotates cam 118 to alternately raise and drop cam follower 116 to oscillate bed 104 and correspondingly the battery carried by the bed. This subjects the battery to a series of jolts to properly seat the battery cell element assemblies in the battery casing. At the completion of the tamping cycle, timer 42 de-energizes motor M2 and subsequently actuates switch LS1 which controls hydraulic cylinder 114 to move the retainer 94 out of the path of the battery to release the battery for movement into align station 10.

When the battery was received onto the tamping ramp and the circuit between the light source and photocell was interrupted, the supply conveyor motor M1 was de-energized so that only one battery at a time is delivered to the tamping ramp.

ALIGN STATION

Before entering into a specific explanation of the construction and operation of the align station, reversion to the tamping ramp operation will be necessary. Timer 42 simultaneously with energizing hydraulic cylinder 114 to move retainer 94 and release a battery for movement onto the aligning station energizes drive motor M3 for conveyor 26 of the aligning station. A conveyor extension 122 is positioned between the tamping ramp and the aligning station and includes a drive arrangement 124 comprising rubber rollers 140 connected to and driven by a sprocket 138 which is in turn connected to central sprocket 134 on the aligning station conveyor by a suitable chain. The aligning station conveyor is a chain and sprocket arrangement comprising chains 137, drive sprockets 135 and driven sprockets 136. Motor M3 is suitably connected to drive sprockets 135 and when energized moves chains 137 and also rotates sprocket 138 to drive rubber wheels 140. The rubber wheels are operative to insure movement of the battery onto the align station conveyor.

When a battery is released for movement into the align station, an align station battery retaining means 142 is in an extended position and is disposed in the path of and to act as a battery stop. Chains 137 move the battery into the align station until it strikes stop 141 of means 142 which moves lever arm 150 to the left to engage and actuate switch LS2. Switch LS2 makes a circuit to valve V2, which controls suitable hydraulic actuating mechanism for the align station battery clamp, so that timer 42 can energize valve V2 to clamp the battery in the align station. LS2 is also operative to set up a circuit to valve V1 so that ramp retainer 94 can be moved to its up position. With these various circuits established timer 42 can activate the align station battery clamp, move the retainer 94 into its up position and energize supply conveyor motor M1 to deliver a second battery to tamping ramp 92.

The align station battery clamp includes a fixed vertical wall 144 and a movable wall 146 supported for horizontal movement on rods 145 and 147 upon actuation of hydraulic cylinder 149. Wall 146 is movable toward and away from wall 144 to selectively clamp and release a battery. With the battery in position, as indicated by actuation of switch LS2, the timer operates valve V2 to activate hydraulic cylinder 149 and move wall 146 toward wall 144 to securely clamp the battery. Simultaneously with operation of valve V2, the timer 42 operates valve V4 to activate hydraulic means 148 to retract retainer means 142. Arm 150 is arranged to engage and actuate a switch LS3 upon retraction thereof with retaining means 142. Switch LS3 sets up a circuit to permit the timer to operate valve V3 and activate hydraulic cylinder 152 for lifting the align station clamp and battery for engagement with aligning head 32.

For a more complete description of the aligning head 32 reference will now be made to FIGS. 2, 8 and 9. Aligning head 32 is adjustably connected to a vertical support 154 by a bracket 156. Bracket 156 includes depending arms 158 for receiving movable support rods 160 and 161. Rods 160 and 161 are fixed to a horizontal support plate 162 and extend through the upper end of depending portions 158 where they are engaged by nuts 164 to complete a connection in the aligning head. Coil springs 166 are seated between support plate 162 and each of the depending arms 158 and biases the support downwardly. With this arrangement the support plate is mounted for vertical movement against the bias of springs 166 for a purpose which will be explained more completely hereinafter.

A plurality of aligning members 168 are mounted on and depend from the underside of support plate 162. Each of members 168 has a bifurcated end 170 to provide relatively spaced aligning arms 172 and 174 which define a downwardly facing notch having a generally semicircular end 176 which conforms generally to the semicircular end 76 of the conductive straps 64 and 66 of the battery cell element assemblies. Extensions 168 are arranged on support plate 162 in pairs 169 with members 168 of each pair having their arms 172 and 174 in relative alignment. Members 168 in each pair are relatively spaced apart a distance slightly greater than the thickness of partition walls 46 and 48, shown in FIG. 8, of the battery and the pairs are spaced apart in accordance with the spacing of the intercell connections to be made in the particular battery construction being processed by the machine. In a six cell battery only five intercell connections are required, hence only five pairs of aligning members 168 are used.

When hydraulic cylinder 152 operates in response to activation of valve V3, the battery is raised for engagement with members 168 of aligning head 34. The members 168 of each pair engage conductive straps disposed on opposite sides of a partition wall with notch 176 registering with the upper end 76 of each vertical portion 70. Should either conductive strap be misaligned relative to the other or the aperture 45 in the partition wall members 168 will move the entire cell element assembly to the left or right, as required, to properly position lug portions 72 and 74 in registry with the partition apertures. It will be appreciated that the relative position of retaining means 142 and aligning head 32 can be pre-set so that the battery case will be properly referenced with respect to the aligning members to insure the necessary engagement between the straps and aligning members for proper alignment of the lugs with the partition openings.

FIGS. 10 and 11 illustrate an alternative arrangement for insuring proper registry of the lugs with the partition apertures. In this arrangement the battery is positioned by retaining means 142 so that members 168a will engage the battery casing in the corners formed by the partition walls and the outer battery case wall so that the corners provide a reference point from which the conductive straps can be aligned with the partition openings. Aligning extensions 168a engage vertical portions 70a of each of the straps and are similarly operative to move the entire cell element assembly through engagement of the notch formed by bifurcated end 170a with end 76a of the vertical portion. Hence the straps are moved either to the right or left as required to properly align the lugs with the partition apertures.

Switch LS2a is positioned in the path of a battery as it is moved on conveyor 26 and is preferably included in the energizing circuit for the align station so that an additional check is provided to insure align station operation only when a battery is positioned at the align station. Switch LS2a is operated through a leaf actuator 171 which is engaged by a battery being carried by conveyor 26 and is used to prevent repeat operation of the align station functions in case a battery fails to move onto the truck 28.

The actual aligning operation is a timed function controlled by timer 42 and at the completion of the aligning step timer 42 operates through valve V3 to lower the battery holder and also operates valve V2 to release the align station battery clamp by movement of wall 146 from engagement with the battery. The aligned battery is now ready for movement out of the align station and into the weld station as will be described more completely hereinafter.

Since one of the battery straps, 64 or 66, is connected to the negative plates and the other battery strap is connected to the positive plates and since the negative strap (64 or 66) of one cell element assembly must be connected to the positive strap of an adjacent cell element assembly, a test for proper relative position (reverse cell test) of the cell assemblies in the battery casing is performed simultaneously with the aligning step just described. Furthermore, it is desirable to test each cell element assembly electrically to detect the presence of a faulty cell assembly and also to test the alignment of the battery itself in the machine.

The test for relative position of the cell element assemblies within the battery case is accomplished by four probes 178 associated with selected pairs of aligning members 168. Probes 178 extend through and are mounted for vertical movement relative to support plate 162. Springs 180 seated between a shoulder 182 on each probe and aligning members 168 bias the probes downwardly toward the battery as it approaches the aligning head. As can be seen in FIG. 9, the probes are offset with respect to the notch in the aligning members and, referring back to FIG. 3, projections 78 and 80 were also provided on the conductive straps in offset relation with the vertical portions thereof. With this arrangement, the probes and the projections 78 and 80 are so positioned that when battery cell element assemblies are properly positioned in the battery, probes 178 will be positioned for engagement with the conductive straps in the area between the end of the projections 78 and 80 and the marginal edge of each of the conductive straps. However, if the cell element assemblies are misaligned, a probe, or probes, will engage the projections 78 and/or 80 as the batteries move into engagement with the aligning members. Upon engagement with the projections the probes move vertically with the battery to effect a signal which will be described more completely hereinafter. This testing arrangement can perhaps best be seen in FIG. 9 wherein a probe is shown disposed between a projection 78 and the edge of the conductive strap, the condition of a properly aligned cell assembly, however, in the event of a misaligned cell element assembly wherein the projection position would be reversed, it can be seen that the probe will engage the projection and be raised vertically during the terminal portion of vertical movement of the battery.

Four switches LS4, LS5, LS6 and LS7 are fixed to support plate 162 by brackets 183 with the actuating plungers 184 thereof in engagement with the upper ends of each probe 178. Vertical movement of any of the probes in response to a misaligned cell assembly will actuate its respective switch LS4, LS5, LS6 or LS7. These switches are each operative to control a memory circuit which is operative to open the circuit to de-energize welding head 34 for a predetermined length of time sufficient to allow the battery containing the misaligned cell element assembly to pass through the welding station without any welds being made therein thus preventing damage to the battery. The actual connection to the welding head to effect the memory circuit will be discussed more completely hereinafter.

The electrical test of each of the cell element assemblies is made through the aligning members. More particularly, respective pairs of the members 168 are connected to a suitable electrical source 185, only one such connection being schematically illustrated in FIG. 8. The extensions 168 which are positioned to engage the conductive straps 64 and 66 of the same battery cell element assembly are connected to a source of electrical energy 185 and upon engagement of the aligning members with the conductive straps a test current is passed through each of the cell element assemblies. The electrical test circuit includes switch LS9 controlled by relay 192 and suitably connected to weld station 12 so that in the event of detection of an electrically defective cell element assembly the welding station will be de-energized as described above to permit the battery containing the defective cell element assembly to pass through the welding station without any welds being made.

The physical test for proper alignment of the battery is accomplished by an arrangement including a pair of depending blocks 186 positioned so that they are not engaged by the positive and negative terminal lugs P and N of a properly aligned battery; however, in the event of a completely misaligned battery lugs P and N engage blocks 186 and, as the battery continues to move upwardly, support platform 162 is moved against the bias of spring 166. Movement of the support platform moves rods 160 and 161 with respect to depending portion 158 of support bracket 156 and toward engagement with plunger 190 of an electrical switch LS8 which is fixedly mounted on bracket 193. Switch LS8 is also connected in circuit with the welding head so that actuation thereof will deenergize the welding station a predetermined time sufficient to again permit the misaligned battery to pass through the welding station without any welding operations being performed thereon.

Assuming the battery to have passed into the aligning station, its cell element assemblies have been properly aligned and the battery has satisfactorily passed the various alignment and electrical tests, it is now ready for delivery to the weld station.

WELDING STATION

As discussed above, when the aligning and testing steps are completed at the align station the battery is lowered, the align station battery clamp is released and the battery is ready for movement from the align station to the weld station. Weld station conveying means 28 includes a trick 200 which will be positioned to the extreme left of the weld station conveyor at the completion of the aligning step.

At the end of the align step, timer 42 operates valve V5a to activate a suitable drive mechanism, to be described, and move truck 200 to the right toward the align station. The truck includes wheels 202 which engage parallel rails 204 and 206 for horizontal movement of the truck relative to the welding head 34. The means for moving the truck on rails 204 and 206 takes the form of sprocket 203, driven by a suitable reversible hydraulic mechanism, and a chain 205 suitably engaging truck 200. Actuation of the hydraulic mechanism by valve V5a will move the truck to the right, whereas actuation by valve V5 will move the truck to the left. The truck includes an independently operable conveyor comprising parallel chains 208 and 210 supported on relatively spaced sprockets 212, 214, 216 and 218. The truck conveyor does not include its own source of power but sprockets 212 and 216 are connected to gear 220, and sprockets 214 and 218 are connected to gear 222 which are operative to impart driving movement to the truck conveyor as will be described more completely hereinafter.

Switch LS10 is positioned for actuation when the truck reaches the align station and is operative to hold an electrical circuit to valve V1 to insure that tamping ramp retainer 94 is held in its up, or locking position, at this point to prevent a battery being released onto the aligning conveyor at this time. Switch LS10 is also connected in the control circuit of the align station conveyor motor M3 so that the motor is energized when the truck reaches and engages the align station conveyor. Turning now to the drive connections for transferring motion to the truck conveyor, it will be noted that drive gear 224 is connected for driven movement with the align station conveyor. Drive gear 224 is positioned to engage gear 222 on the truck which, through a gear (not shown) to effect a reversal of motion, completes a driving connection between drive gear 224 and gear 222 on the truck. Sprockets 214 and 218 are thus driven by the align conveyor and drive chains 218 and 220 toward the left as viewed in FIG. 12. In this manner power is transmitted to the truck conveyor and the battery is transferred from the align station conveyor to truck 200.

Truck 200 includes a pivotal retainer 230 having an elongated extension 232 which, when the truck reaches the right extremity of its travel, is positioned adjacent stop 234 fixed relative to the truck. Stop 234 limits pivotal movement of retainer 230 so that the retainer functions as a stop to position the battery on the truck. The battery moves to the left on the truck conveyor until it strikes retainer 230 whereupon extension arm 232 moves into engagement with stop 234 and also engages and actuates switch LS11 positioned below the stop and operative to set up a circuit to permit the timer 42 to activate valve V6 to close the weld station battery clamp to hold the battery firmly in place on the truck. The weld station battery clamp includes a stationary upright wall 236 and a wall 238 supported for movement toward and away from stationary wall 236 to selectively clamp and release a battery. When the battery strikes retainer 230, switch LS11 is actuated to set up a circuit to permit timer 42 to activate valve V6 and energize hydraulic mechanism 235 for moving wall 238 toward fixed wall 236 to securely hold the battery therebetween. Wall 238 is shown in its clamp position in FIG. 12 and springs 239 will return it to its open position upon deenergization of hydraulic mechanism 235. With the battery securely clamped in place the truck is now ready for movement to the left and through the weld station and timer 42 now energizes the truck drive to effect this movement. When the engagement with the align station conveyor is broken the truck conveyor (chains 208 and 210) comes to rest.

Welding head 34 preferably contains only two sets of welding jaws to minimize the amount of current which must be supplied to the machine for the welding operation and this construction necessitates that the battery and truck be moved in steps through the welding station. To effect this stepped movement indexing means 250 is provided and includes the stationary wall 236 which is releasably connected to the truck by bolts 252. Plate 236 includes three indexing bushings 254, 256 and 258 which are each positioned above laterally extending switch actuating buttons 260, 262 and 264. Shot pin mechanism 266 is mounted at the weld station and comprise an indexing pin 270 slidably supported in a bearing member 272 and connected by rod 274 to a hydraulic cylinder 276. A switch actuator 278 is mounted on and movable with rod 274 to alternately actuate switches LS12 and LS13. Switch LS14 is located below index pin member 270 and is positioned in the path of actuating buttons 260, 262 and 264 for engagement and actuation thereby. Switch LS14 is connected in the control circuit of the truck drive and also in the control circuit for actuating valve V14 which controls cylinder 276. Accordingly, timer 42 starts up the truck drive and truck 200 moves to the left until button 260 engages and actuates switch LS14 whereupon the truck drive is deenergized and a circuit is set up to allow actuation of cylinder 276 to move index pin 270 outwardly for engagement with plate 236. When button 260 engages switch LS14 bushing 254 will be in the vicinity of and receive index pin 270. When the index pin is seated in bushing 254 plate 236 is properly positioned to index the first set of weld connections in vertical alignment with the welding jaws.

Welding head 34 is connected for vertical movement on a support post 280 by bracket 286 so that welding jaws 282 and 284 can be lowered for engagement with conductive straps of adjacent cell element assemblies. More particularly, when index pin 270 is moved outwardly switch actuator 278 releases switch LS12 and engages and actuates LS13 which controls actuation of valve V7 for actuating hydraulic cylinder 298 for moving weld head 34 downwardly toward the battery. The actual welding cycle is controlled by the timer and after the weld sequence, which will be described more completely hereinafter, is completed, valve V7 is again operated to activate cylinder 298 and raise the weld head. As the head is raised it engages and actuates a switch LS15, suitably fixed relative to the welding head, which sets up a circuit to valves V14 and V7 for retraction of index pin 270 to allow another step of the truck to the left and also to stop the weld head. The return stroke of index pin 270 actuates switch LS12 to set up a circuit for re-energizing the truck drive and also opens switch LS13 to prevent downward travel of weld head 34. The truck is again moved to the left until button 262 engages switch LS14 whereupon the truck drive is de-energized and cylinder 276 energized to move index 270 outwardly for engagement in bushing 256 to index the truck for a second weld sequence. Switch LS12 is opened and switch LS13 is closed to move the weld head down to effect the second weld sequence. The third indexing step will occur as described above with the index pin being located in bushing 258 to positively locate the truck and battery for the third weld sequence. With this arrangement, it will be appreciated that a particular battery is indexed through the weld station in steps and that the number of welds can be varied as desired by merely changing plate 236 to include either more or less indexing bushings.

Turning now to FIGS. 13-15 welding head support bracket 286 includes relatively spaced vertically extending arms 288 and 290 for receipt of support rods 292 and 294 which are connected to yoke 296 of the weld head. Hydraulic mechanism 298 is connected to yoke 296 at point 300 so that actuation thereof moves the yoke 296 vertically on rods 292 and 294 and with respect to arms 288 and 290 to effect the vertical movement of the weld head. Horizontal support platform 302 is clamped to the lower extremities of yoke 296. More particularly, platform 302 comprises upper plate 304 and lower plate 306 suitably interconnected as by screws 308. Plates 304 and 306 are positioned between clamping members 310 and 312, member 312 being attached to yoke 296 and members 310 being releasably connected to members 312 by bolts 314. Welding jaws 282 and 284 are connected to support plate 302 by suitable connecting means 316. The construction of the welding jaws 282 and 284 is identical and each includes a pair of arms 318 and 320 pivotally supported from connecting means 316 at points 322 and 324. Welding terminals 326 and 328 are supported at the free ends of each of the arms 318 and 320 and include conductive mounting extensions 330 and 332 which are received between clamping blocks 334 and 336 and the lower ends of arms 318 and 320. Blocks 334 and 336 also provide electrical terminals through which current can be supplied to the welding terminals. Welding faces 338 and 340 are provided on the welding terminals 326 and 328 and are aligned for engagement with opposed vertical portions 70 of conductive straps of adjacent cell element assemblies. Electric current is supplied to the welding head 34 through electrical leads 348, 350, 352 and 354 extending between support plate 302 and respective ones of the welding jaws 318 and 320. The actual electrical connection for effecting electrical distribution can take any form well known in the art.

Movement of welding terminals 326 and 328 toward and away from each other to engage welding faces 328 and 340 with the conductive straps is produced by an actuating mechanism which is identical for each set of arms 318 and 320. This actuating mechanism includes cam plates 356 fixed to and movable with connecting rods 357 of hydraulic cylinder 358. Cam plates 356 includes angularly disposed slots 360 and 362 which engage pins 364 and 366 fixed to arms 318 and 320. Operation of each of the hydraulic mechanisms 358 alternately raises and lowers cam plates 356 to move pins 364 and 366, and correspondingly arms 318 and 320, and move the welding terminals toward and away from each other.

The weld sequence is controlled by timer 42. Valve V8 controls operation of hydraulic cylinder 358 for front welding jaws 282 and valve V9 controls operation of hydraulic 358 for rear welding jaws 284, with both valves being controlled by the timer and also by switch LS16 which is actuated when the weld head is lowered. The welding operation is achieved sequentially with one of the welding jaws clamping and welding to produce one weld, there welding jaws are then released and the other welding jaws clamp, weld and are subsequently released. Sequential operation is preferred as it keeps the amount of welding current which must be available at a minimum; however, two or more welds could be made if desired. More particularly, when the weld head is lowered terminals 326-326 and 328-328 are positioned on opposed sides of a partition wall for engagement with the vertical legs of aligned conductive straps adjacent cell assemblies. When the weld terminals are properly positioned, the timer sequentially activates valve V8 and V9 to operate hydraulic mechanisms 358-358, so that one set of terminals are moved together to squeeze mating lugs 72 and 74 into engagement with a predetermined amount of pressure. With the lugs so engaged, a welding current is passed through the lug portions to melt and fuse the lugs together to thereby provide a weld joint therebetween and effects an intimate seal with the partition walls. With one weld connection having been completed, the first set of welding terminals are released by the timer, this opens the electric circuit to these welding jaws and sets up a circuit to the other welding jaws. The second hydraulic mechanism 358 is activated to operate the second set of welding terminals to effect a second weld connection in the manner described above. With both weld connections completed, the weld head is raised, the truck and battery indexed to the left as described above and a second set of weld connections is made. It will be noted that with the six cells and five connections of the battery used to illustrate the operation of the machine, only one connection is made at the third index step of the battery and the timer is operative to activate only one set of the weld jaws at the third index step.

Reverting now to the align station, had the battery failed any one of the alignment tests or the electrical tests at the align station, actuation of one, or all, of switches LS4-9 will have opened the circuit to valve V14 controlling hydraulic mechanism 276 so that the shot pin mechanism cannot be operated. The index pin will not move out to engage wall 236 and switch LS13 will not be operated and welding head 34 will not be lowered to attempt any welds in the battery. The timer will step the truck through the weld station but no other operations will be performed at the weld station and the battery will bypass the weld operations.

Due to the head generated during the welding cycle, it is desirable to provide for circulation of a cooling medium through the welding jaws. Preferably water is circulated through hoses 370 to effect this cooling and it is preferably at a temperature of approximately 110° – 125° F. Hot water is preferred as cold water passing through the metallic welding jaws would cause an undesirable sweating condition.

It is desirable that the pressure applied by welding faces 338 and 340 be evenly distributed over the vertical portions of the conductive straps to insure an acceptable connection between the conductive lugs. To insure an even distribution the pivot points 322 and 324 for the arms 318 and 320 are positioned relative to the position which the vertical portions 70 of the conductive straps assume so that faces 338 and 340 are brought into engagement with the vertical portions in parallel relationship therewith. As illustrated in FIG. 15, with the vertical portion 70 of the straps having a slightly angled face the pivot points 322 and 324 and the length of arms 318 and 320 are selected so that faces 338 and 340 will be at the same angle for engagement therewith. With straight faces on the vertical portions, pivot points 322 and 324 would be positioned directly above the vertical portions.

In transporting the battery from the align station to the weld station and in indexing the battery through its various steps at the weld station it is possible that welding lugs 72 and 74 may become slightly misaligned. To insure proper alignment for welding a final alignment of the welding lugs is accomplished in the weld station. More particularly, the battery straps are provided with wedge shaped projections 82 at the juncture of vertical portions 70 and horizontal portions 68. The lower edges of welding terminals 326 and 328 are provided with wedged shaped notches 370, which are positioned to engage projections 82 as the welding jaws are moved toward each other for engagement with the conductive straps. The engagement between the notches and wedged projections will produce a caming action and align lugs 72 and 74 with respect to each other and with respect to the partition openings 45.

With all of the weld connections having been completed the battery is now ready for movement out of the welding station and for movement into the testing station.

TEST STATION

At the completion of the last weld at the welding station, the welding head is raised, engages switch LS15 and energizes the truck drive to move the truck to the left. In this instance, the indexing mechanism having cleared switch LS14 the truck will continue to move to the left until it strikes test station conveyor 30. The test station conveyor comprises chains 380 and 382 and sprockets 384, 386, 388 and 390 connected to and driven by a motor M5. Similar to the align station, a drive gear 392 is rotatable with sprockets 386 and 390 and is positioned for engagement with gear 220 on truck 200, which, through a motion reversing gear (not shown), is connected to and operative to rotate sprockets 212 and 216 and drive chains 208 and 210 of the truck conveyor. It should be noted that after the truck is moved away from stop 234 retainer 230 is free for pivotal movement about its pivotal connection so that with the truck conveyor energized a battery can roll over the retainer and onto test station conveyor means 30. Test station conveyor means 30 carries the battery to the left in the testing station until it strikes battery retaining means 400. The battery strikes stop 401 of retaining means 400 and moves arm 403 to the left to actuate switch LS 17 which sets up a circuit to permit activation of a test station battery clamp. The test station battery clamp is operated by hydraulic mechanism 405 which is controlled by valve V11. The test station battery clamp is similar to the align station battery clamp and upon activation of valve V11 a movable wall 402 is driven toward a fixed wall 404 to clamp the battery therebetween. With the battery securely clamped the timer operates to retract retaining means 400 by activating valve V12 to operate hydraulic mechanism 407. Retraction moves arm 403 to engage and actuate switch LS18 to set up a circuit to valve V10 to permit the timer 42 to energize hydraulic mechanism 406 to raise the test station battery clamp and battery for engagement with testing head 36.

The testing operation is a timed function controlled by timer 42 and when the battery is suitably positioned with respect to the testing head the timer activates a valve V13 which controls a mechanism to be described for exerting a predetermined force of sufficient magnitude to rupture any welds which are below minimum standards.

Figure 18:
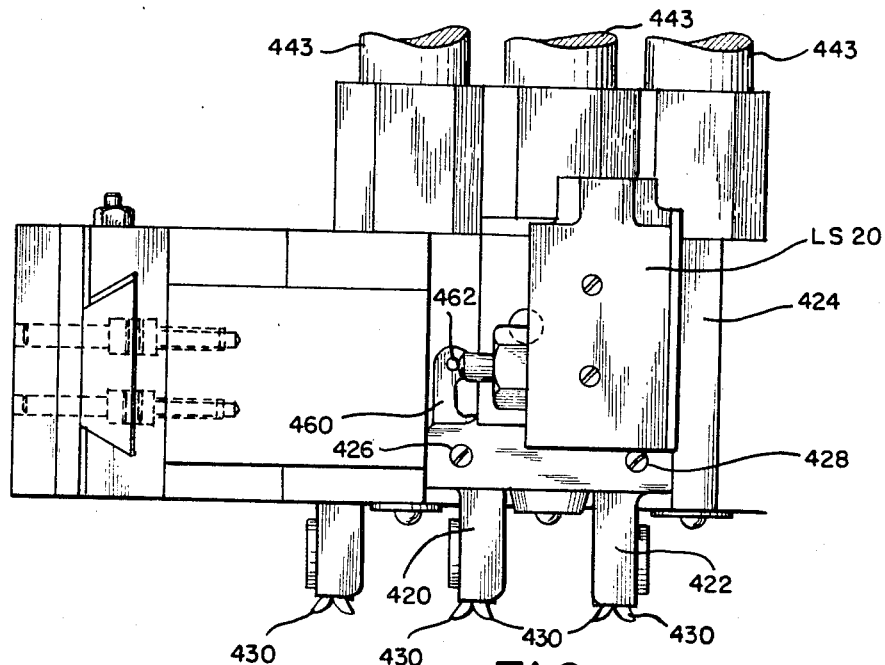
FIG. 18 is a front elevation of a portion of the testing head.
Figures 19, 20:
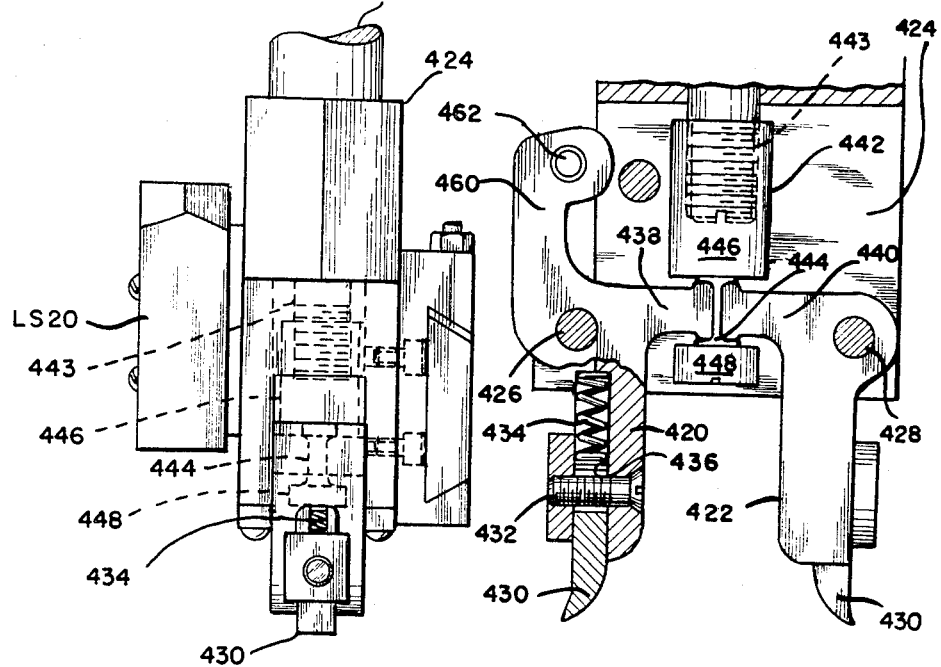
FIG. 19 is an end view of the testing head.
FIG. 20 is a partial front view in section of a portion of one of the testing mechanisms.

Turning now to FIGS. 18—20, the testing head will be described in detail. Testing head 36 is mounted on a vertical mounting post 408 and includes a plurality of testing stations 410, 412, 414, 416 and 418 one for each intercell connection, and each of identical construction. As illustrated in FIG. 20, each of the testing members include a pair of arms 420 and 422 pivotally mounted in a housing 424 on pins 426 and 428. A test finger 430 is connected in each of the arms 420 and 422 by a pin 432 extending through a vertical slot provided in fingers 430. A coil spring 434 is seated between the arms 420 and 422 and each of the fingers 430 to bias the fingers downwardly with slot 436 providing for relative vertical movement between the fingers and arms 420 and 422. As the battery is raised to the testing head fingers 430 engage the conductive straps and are capable of some limited vertical movement to prevent damage to the battery.

Arms 420 and 422 each include inwardly facing extensions 438 and 440 which engage an actuating member 442 connected to a vertically movable hydraulic actuator 443. Extensions 438 and 440 engage a reduced cross section portion 444 of member 442 and are confined between body 446 and an enlarged end portion 448 of member 442 so that arms 438 and 440 are movable with actuating member 442. With this arrangement, vertical movement of the actuating member causes pivotal movement of arms 420 and 422 about their respective pivot connections. With the battery suitably positioned and clamped in the test station battery holder it is raised toward the testing head and each set of welded conductive straps are engaged by a pair of testing fingers 430. Reverting now to the construction of the battery, it will be remembered that raised projections 78 and 80 were provided on each conductive strap. The pairs of fingers 430 are positioned to engage the raised projections 78 and 80 corresponding to each of the intercell connections. When so engaged the timer operates the hydraulic cylinder 443 at each testing station to move acting members 442 and pivot arms 420 and 422 outwardly which, through fingers 430 applies a predetermined force in tension on each intercell weld connection. The amount of the force is selected as desired and should a weld be defective or below the predetermined minimum standard it will be ruptured.

At this point it will be appreciated that any of a number of suitable means could be used to visually indicate a ruptured weld, for example a mark could be placed on the conductor straps adjacent the ruptured weld, or a visual signal could be given to an operator who could then manually remove the battery from the testing station for repair. However, in keeping with the automatic nature of the entire machine, it is desirable that an automatic reject mechanism be provided and this will be described in connection with the next station, namely the reject station. However, the sensing controls for the reject station are included in the test station and include switches LS20, LS22, LS24, LS26 and LS28 are included in each of the testing stations. One of the testing arms, in this instance arm 420 includes a vertical extension 460 which carries an elongated rod 462 positioned for engagement with the plungers of each of the switches LS20-28. In the event of rupture of a weld the outward travel of fingers 430 and arms 420 and 422 exceeds a predetermined limit and the rod 462 of that particular station engages and actuates its respective switch. This switch sets up a circuit to the reject station so that the battery containing the ruptured weld will, when it is received on the output conveyor, be moved into a reject line.

It is also preferable to accomplish a second and final test on the connected battery at the testing station, namely to pass an electrical test current through the interconnected battery cell element assemblies to check the intercell connection for desired minimum electrical characteristics. To achieve this electrical terminals 461 and 463 can be suitably positioned on the aligning head to engage the positive and negative lugs P and N of the battery so that simultaneously with the mechanical testing an electrical test current from source 465 is powered through the battery with a switch LS30, controlled by relay 467, being suitably connected to the reject station so that should any battery not meet minimum prescribed electrical standards the reject station activated to reject that battery when it is discharged from the test station.

Assuming the battery at the testing station to have passed the desired tests, the timer will de-activate valve V13 to turn off the mechanical testing pressure, de-activate valve V10 and energize the test station conveyor motor M4 so that the battery is lowered to the conveyor and is transported out of the test station to the reject station.

REJECT STATION

The reject station comprises an unload conveyor 470 divided into an output line 474 and reject line 472 by a partition 473. When the test procedures are completed at the test station and the battery is ready for movement out of the machine, the timer energizes unload conveyor motor M4. The battery moves onto unload conveyor 470 from the test station conveyor 30 and, assuming the battery to have passed the various tests at the test station, it moves down output conveyor line 474. However, assuming that the battery failed either the mechanical or electrical test at the testing station, actuation of any of switches LS20-30, will have to set up a circuit to valve V15 to provide for movement of battery reject stop 476 into the path of batteries moving onto the unload conveyor. Battery reject stop 476 comprises a movable arm 478 which carries a roller arm 480. With the battery positioned in engagement with stop 476 the timer operates to activate valve V17 and operate reject mechanism 486. Reject mechanism 486 comprises a plate 488 mounted for movement transversely of the output conveyor by hydraulic cylinder 490 which is connected to and controlled by valve V17. Plate 488 engages and moves the battery from output line 474 to reject line 472. The rejected battery moves down reject line 472 and actuates switch LS32, through a suitable switch actuation arm which releases the reject stop mechanism and sets up the test mechanism for another testing cycle.

OPERATION

To summarize the operation of the machine just described, batteries are brought to the machine by a supply conveyor and moved onto a tamping ramp 92 where each battery is subject to a series of vertical oscillations to shake down the battery cell element assemblies and insure a secure seating of the cell element assemblies in the battery case. The machine operation is essentially timer controlled and after the tamping operation, the timer releases the tamping station retainer 94 and allows a battery to pass from the tamping station over conveyor 24 onto the align station conveyor. When a battery is positioned on the tamping station ramp, the main supply conveyor motor is de-energized and remains de-energized until the retainer 84 is again moved to its up position to prevent release of a second battery onto the align station conveyor. When the battery moves onto the align station conveyor it actuates switch LS2 which controls the circuit to a hydraulic mechanism for closing the align station battery. With the battery securely clamped at the align station, retaining means 142 is retracted and actuates switch LS3 which sets up a circuit to allow the timer to now energize hydraulic mechanism for raising the battery for engagement with the aligning head 32. In the aligning station, depending bifurcated aligning extensions engage respective ones of the conductive straps on adjacent battery cell element assemblies to align the straps with respect to each other and to position the intercell lugs in alignment with the partition wall openings. Simultaneously with the alignment, a check is made as to whether or not the cell element assemblies are properly positioned in the battery, a second check is made to determine whether or not the entire battery is properly positioned in the machine and, thirdly, an electrical test is made of the cell element assemblies. Assuming the battery passes each of these tests the timer then de-activates hydraulic mechanism 152, lowers and releases the battery and energizes the align station conveyor. The welding station truck, which had been positioned to the left, is moved to the right and its conveyor drive engages the aligning station drive so that the battery is discharged from the align station conveyor onto the truck conveyor.

The battery moves onto the truck until it strikes the battery retainer 230 whereupon it actuates switch LS11 to activate the truck clamp and securely hold the battery in the truck. The timer now energizes the truck drive and the truck proceeds to the left until switch LS14 is engaged to de-energize the truck drive and to energize the shot pin mechanism to move the indexing pin into the first indexing bushing whereupon the battery and holder are properly indexed with respect to the welding jaws. Movement of the index pin activates switch LS13 and a circuit is set up to hydraulically lower the welding head. As the welding head is lowered switch LS16 is actuated and the welding jaws are properly positioned with respect to pairs of the conductive straps for welding. When the welding head is positioned, the timer activates valves V8 and V9 sequentially to make the front and rear weld connections. With the weld connections completed the timer operates to raise the welding head which engages and operates switch LS15 to retract the index pin and start up the truck drive. The truck then indexes to the next station and this process is repeated until all of the welds are made.

Reverting now to the align station, had the particular battery failed any of the three tests which were carried on at the align station so that either switches LS4-9 had been actuated these switches would have set up a circuit which would have opened the circuit to the hydraulic mechanism for actuating the index pin so that the index pin cannot move forward and switch LS13 is not actuated and the welding head is not lowered. The truck is stepped through the welding station by the timer but is not properly indexed and the welding head does not move down to attempt any welds in that particular battery.

After the weld sequences, the truck proceeds to the left where it engages the test station conveyor and discharges the welded battery onto the test station conveyor. The battery moves on the test station conveyor until it strikes battery retaining means 400 to actuate switch LS17 and operate the test station battery clamp. With the battery rigidly held at the test station, the timer activates hydraulic mechanism 407 to retract means 400 which actuates switch LS18 to operate hydraulic mechanism 406 to raise the battery to the test head. The battery is then engaged in the test head and a predetermined force, in tension, is applied to each of the welds in a sufficient amount to rupture any defective welds. Simultaneously with this mechanical testing an electrical test current is passed through the entire battery to determine whether or not the welds are acceptable from an electrical standpoint. Assuming the battery to pass each of these tests, the timer operates hydraulic mechanism 406 to lower the battery, releases the battery and energizes the test station conveyor to transport the battery to the left and discharge it onto the output conveyor.

In the event that the battery fails either of the electrical or mechanical tests at the testing station, a circuit is set up to energize and move the reject stop 480 into the path of the defective battery. This stops the battery and positions it directly in line with the reject arm 488. The timer activates mechanism 490 for the reject arm and the defective battery is moved from the output line into a reject line 472. In passing down the reject line the defective battery engages switch LS32 to retract both the reject stop and ram and to set up the test station for another cycle.

It will be appreciated that with this machine a battery can be located at each station during operation of the machine with the various steps (align, weld and test) being carried out simultaneously. After a battery has passed out of the align and test stations, the timer will operate to move the battery retaining means at the align and test stations outwardly for engagement with a succeeding battery to maintain the continuity of operation of the machine. Furthermore, the actual electrical connections between station, switches and hydraulic valves, etc., have not been illustrated and described in detail as they can take any form well known in the art.

Although this invention has been illustrated and described in connection with particular embodiments thereof, it will be apparent to those skilled in the art that various changes and modifications may be made therein without departing from the spirit of the invention or from the scope of the appended claims.

We claim:

1. Apparatus for use in manufacturing batteries having cell element assemblies connected by an intercell weld joint between conductive portions of cell element assemblies and operative to align adjacent ones of said conductive portions for making said weld connections, said apparatus comprising, an aligning head, battery support means, means for providing relative movement between said aligning head and said battery support means so that said aligning head is engageable with cell element assemblies positioned in a battery carried by said battery support means, said aligning head including a pair of adjacent arms arranged in relative alignment and spaced apart with respect to each other to engage and position cell element assemblies of a battery supported by said battery support means with the conductive portions of adjacent cell element assemblies in alignment for making an intercell weld joint.

2. Apparatus for use in manufacturing batteries having cell element assemblies connected by an intercell connection through the battery partition walls and between conductive portions of adjacent cell element assemblies, said apparatus comprising, an aligning head, a plurality of pairs of bifurcated aligning extensions on said aligning head, a battery support, means for providing relative movement between said battery support and said aligning head so that said aligning extensions are engageable with a battery supported by said battery support, said pairs of extensions being spaced apart in predetermined relationship and said extensions in each of said pairs being arranged with their bifurcations in relative alignment and also so that said extensions engage said conductive portions on opposite sides thereof to align said conductive portions of cell element assemblies for welding.

3. The apparatus of claim 2 including means for testing the position of cell element assemblies in a battery, said testing means including sensing means positioned for engagement with a misaligned battery cell element assembly as said aligning head and battery cell element assemblies of a battery supported by said battery support are moved toward engagement, and signal means positioned for connection with and control by said sensing means and operative when actuated thereby to produce a signal.

4. The apparatus of claim 2 wherein said sensing means includes movable probes and spring means biasing each of said probes toward said battery support, and electric switch means arranged for actuation by each of said probes when said probes are engaged and moved by a misaligned battery cell element assembly.

5. The apparatus of claim 4 wherein said battery cell assemblies include a raised portion positioned to be facing said probes and arranged to be spaced from said probes when said battery cell element assemblies are properly aligned within said battery and to be disposed in the path of said probes when the battery cell element assemblies are misaligned to engage and move said probes for actuation of said switch means.

6. The apparatus of claim 2 wherein said aligning head is mounted for movement in the direction of said relative movement and is spring biased towards said battery support, said aligning head including means for testing the position of a battery in said battery support and arranged for engagement with and movement by a misaligned battery, signal means, and means movable with said aligning head and arranged to engage and actuate said signal means upon movement of said aligning head by a misaligned battery.

7. The apparatus of claim 2 including means connected to pairs of said bifurcated aligning extension for passing a test current through each of said cell element assemblies and operative in response to said test current to signal a defective cell element assembly.

8. Apparatus for use in manufacturing batteries having cell element assemblies connected by an intercell weld joint between conductive portions of cell element assemblies and operative to align adjacent ones of said conductive portions for making said weld connections, said apparatus comprising, an aligning head, battery support means, means for providing relative movement between said aligning head and said battery support means so that said aligning head is engageable with a battery carried by said battery support means, said aligning head including a pair of adjacent arms arranged in relative alignment and spaced apart with respect to each other to engage and position cell element assemblies of a battery supported by said battery support means with the conductive portions thereof in alignment for making an intercell weld joint, means for testing the position of battery cell element assemblies in a battery, said testing means including sensing means positioned for engagement with a misaligned battery cell element assembly as said aligning head and battery cell element assemblies of a battery supported by said battery support means are moved toward engagement, and signal means connected with and controlled by said sensing means and operative when actuated by said sensing means to produce a signal.

9. Apparatus for use in manufacturing batteries having cell element assemblies connected by an intercell weld joint between conductive portions of cell element assemblies and operative to align adjacent ones of said conductive portions for making said weld connections, said apparatus comprising, an aligning head, battery support means, means for providing relative movement between said aligning head and said battery support means so that said aligning head is engageable with a battery carried by said battery support means, said aligning head including a pair of adjacent arms arranged in relative alignment and spaced apart with respect to each other to engage and position cell element assemblies of a battery supported by said battery support means with the conductive portions thereof in alignment for making an intercell weld joint, and means connected to selective pairs of said aligning arms for passing a test current through each of said cell element assemblies and operative in response to said test current to produce a signal corresponding to a defective cell element assembly.

* * * * *